(12) United States Patent
Raho

(10) Patent No.: US 10,794,684 B2
(45) Date of Patent: Oct. 6, 2020

(54) INTERFEROMETRIC TOUCH PROBE

(71) Applicant: Quality Vision International, Inc., Rochester, NY (US)

(72) Inventor: Guglielmo Raho, Chieri (IT)

(73) Assignee: QUALITY VISION INTERNATIONAL INC., Rochester, NY (US)

( * ) Notice: Subject to any disclaimer, the term of this patent is extended or adjusted under 35 U.S.C. 154(b) by 128 days.

(21) Appl. No.: 15/837,063

(22) Filed: Dec. 11, 2017

(65) Prior Publication Data

US 2019/0178629 A1   Jun. 13, 2019

(51) Int. Cl.
*G01B 11/00* (2006.01)
*G01B 21/04* (2006.01)
(Continued)

(52) U.S. Cl.
CPC ............ *G01B 11/007* (2013.01); *G01B 5/012* (2013.01); *G01B 7/012* (2013.01); *G01B 9/02* (2013.01); *G01B 9/02007* (2013.01); *G01B 9/0209* (2013.01); *G01B 11/2441* (2013.01); *G01B 21/042* (2013.01); *G01B 5/0009* (2013.01)

(58) Field of Classification Search
CPC ........ G01B 11/007; G01B 9/02; G01B 5/012; G01B 7/012; G01B 9/0209; G01B 11/2441; G01B 21/042; G01B 9/02007; G01B 5/0009

See application file for complete search history.

(56) References Cited

U.S. PATENT DOCUMENTS 5,118,956 A   6/1992   Dunning et al.
9,062,958 B2  6/2015   Hidaka et al.
(Continued)

FOREIGN PATENT DOCUMENTS

JP   2007-212182 A      4/2007
JP   2007101491 A  *   4/2007
JP   2008096295 A      4/2008

OTHER PUBLICATIONS

International Search Report and Written Opinion from corresponding PCT/US2018/064701, dated Mar. 11, 2019 (10 pages).

*Primary Examiner* — Que Tan Le
*Assistant Examiner* — Jennifer D Bennett
(74) *Attorney, Agent, or Firm* — Andrew J. Anderson, Esq.; Harter Secrets & Emery LLP

(57) ABSTRACT

A touch probe for sensing the position of a surface, having a housing and a moving assembly supported within the housing and including a flexible reflective element, a spacer element, and a semitransparent element, wherein a reflective surface of the flexible reflective element and a surface of the semitransparent element are separated by the spacer element, and a stylus connected to the flexible reflective element. Movement of the stylus responsive to a force causes the flexible reflective element to flex and change distances between points on the reflective surface and on the surface of the semitransparent element. Coherent light incident upon the semitransparent element and directed towards the reflective surface creates interference fringes dependent upon separation distances between the reflective surface and the surface of the semitransparent element. A detector senses changes in the interference fringes patterns in response to flexing of the flexible element.

4 Claims, 2 Drawing Sheets

(51) Int. Cl.
 *G01B 5/012* (2006.01)
 *G01B 11/24* (2006.01)
 *G01B 9/02* (2006.01)
 *G01B 7/012* (2006.01)
 *G01B 5/00* (2006.01)

(56) References Cited

U.S. PATENT DOCUMENTS

2006/0283338 A1* 12/2006 Degertekin ............ B82Y 35/00
 99/486
2019/0041186 A1 2/2019 Olszak

* cited by examiner

INTERFEROMETRIC TOUCH PROBE

TECHNICAL FIELD

The invention relates to touch probes, and in particular to an interferometric touch probe for use in a coordinate measuring machine or machine tool for determining the position of a work piece.

BACKGROUND OF THE INVENTION

Precise measurements of machined parts are traditionally made using a Coordinate Measuring Machine (CMM) with a touch probe. The CMM is calibrated such that the position of the touch probe is known as the probe is moved throughout the space in which measurements are made. The CMM detects when the probe makes contact with the part being measured; the position is recorded as a point on the measured part. By making repeated contact with the part various features of the part can be measured.

Traditionally the contact of the probe with the measured part has been detected using a mechanical arrangement of springs and electrical contacts (such as, e.g., DEA TF6, Renishaw TP2 and TP20 probes). The springs require a minimum force to move the probe enough to register contact. Alternatively, systems based on deformation of strain-gauges are also known (such as, e.g., Renishaw TP200 probe), which can measure with lower force than spring systems, but even that force can be more than is acceptable for measuring some very soft or flexible parts due to the flection it can induce before the trigger is generated with consequent uncertainty.

Many alternative designs have been proposed that obviate the need for springs. In U.S. Pat. No. 5,118,956, Dunning et al describe a touch probe that incorporates a wave guide into the probe and an interferometer optical system for detecting when the probe makes contact. The probe and optical system (employing, e.g., Michelson interferometer comprising beam splitters and reference mirrors forming separate sensing arm and reference arm) are both complex and expensive. Some known designs use dimensional interferometry to determine when the probe makes contact with the measured part, and are capable of making measurements with forces significantly reduced from the spring and strain-gauge designs. In U.S. Pat. No. 9,062,958 Hidaka and Ishikawa describe a design with a simpler probe, but the interferometric optical system required to detect when the probe makes contact is even more complex, and thus expensive, than that described by Dunning et al. In Japanese patent application JP2008096295, Kazuhiko et al describe another interferometric design that uses a different complex optical system.

It would be desirable to provide a touch probe employing a simple interferometric system for determining when the touch probe makes contact with a measured object while requiring a minimal force.

SUMMARY OF THE INVENTION

A first embodiment is directed towards a touch probe for sensing the position of a surface, having: a housing; a moving assembly supported within the housing and comprising a flexible reflective element, a spacer element, and a semitransparent element, wherein a reflective surface of the flexible reflective element and a surface of the semitransparent element opposing the reflective surface are separated by the spacer element in a first arrangement over a first area of the reflective surface when the flexible reflective element is in a first relatively non-flexed position; a stylus connected to the flexible reflective element, where the moving assembly and stylus are configured such that movement of the stylus responsive to a force on the stylus causes the flexible reflective element to flex and change distances, relative to the first relatively non-flexed position, between points on the reflective surface of the flexible reflective element and on the opposing surface of the semitransparent element over the first area of the reflective surface; a coherent light source configured for providing coherent light incident upon the semitransparent element and directed through the semitransparent element towards the reflective surface of the flexible reflective element, whereby the coherent light is partially internally reflected from the opposing surface of the semitransparent element surface and partially transmitted through the semitransparent element to the reflective surface of the flexible reflective element, such that light reflected from the reflective surface can constructively or destructively interfere with the internally reflected light in the semitransparent element and create interference fringes over the first area dependent upon separation distances between the reflective surface of the reflective element and the opposing surface of the semitransparent element; and a detector configured for sensing changes in interference fringes patterns over the first area in response to flexing of the flexible element and change in distances between points on the reflective surface of the flexible reflective element and on the opposing surface of the semitransparent element over the first area of the reflective surface.

A further embodiment is directed towards such a touch probe, wherein the reflective surface of the flexible reflective element and the opposing surface of the semitransparent element are parallel and separated by a uniform distance over the first area when the flexible reflective element is in the first relatively non-flexed position.

A further embodiment is directed towards such a touch probe, further comprising a kinematic joint providing a repeatable rest location for the moving assembly in the housing, enabling movement of the moving assembly from the rest location responsive to a deflecting force on the stylus and return of the moving assembly to the rest location when the deflecting force is removed.

BRIEF DESCRIPTION OF THE DRAWING FIGURES

DETAILED DESCRIPTION OF THE INVENTION

Disclosed is a probe design that incorporates the sensitivity of interferometry to detect when a touch probe makes contact with a measured part with a very simple, yet sensitive optical system for detecting when contact is made. Unlike probes that rely on displacement of the probe against springs, which are sensitive to the azimuthal angle at which the probe makes contact with the measured object, the disclosed design has no moving parts before the trigger and may be implemented in such a way that it is highly isotropic. The system is auto resetting when the probe attitude is changed. Only the transient vibration must settle while no threshold adjustment must be made. Systems that actually measure a displacement like strain-gauge systems need both the transient vibration to end and, after the signal from the elements measuring the displacements is stable, to sample and hold it to establish the new thresholds; as a consequence the time between two measurements becomes longer. The present disclosed design allows high accuracy while not losing productivity because transients are minimal.

An embodiment of the touch probe system of the present disclosure is described with respect to figures in the attached drawings. In operation, the touch probe 10 is attached to the head of a coordinate positioning machine (e.g., a coordinate measuring machine) or machine tool, which is not shown. Coordinate measuring machines may include conventional X, Y and Z drive motors, as well as control and calibration units. The various components and constructions of coordinate measuring machines employ well-known structural and electronic elements know to those skilled in the art, and thus do not require detailed explanation.

Figure 1:
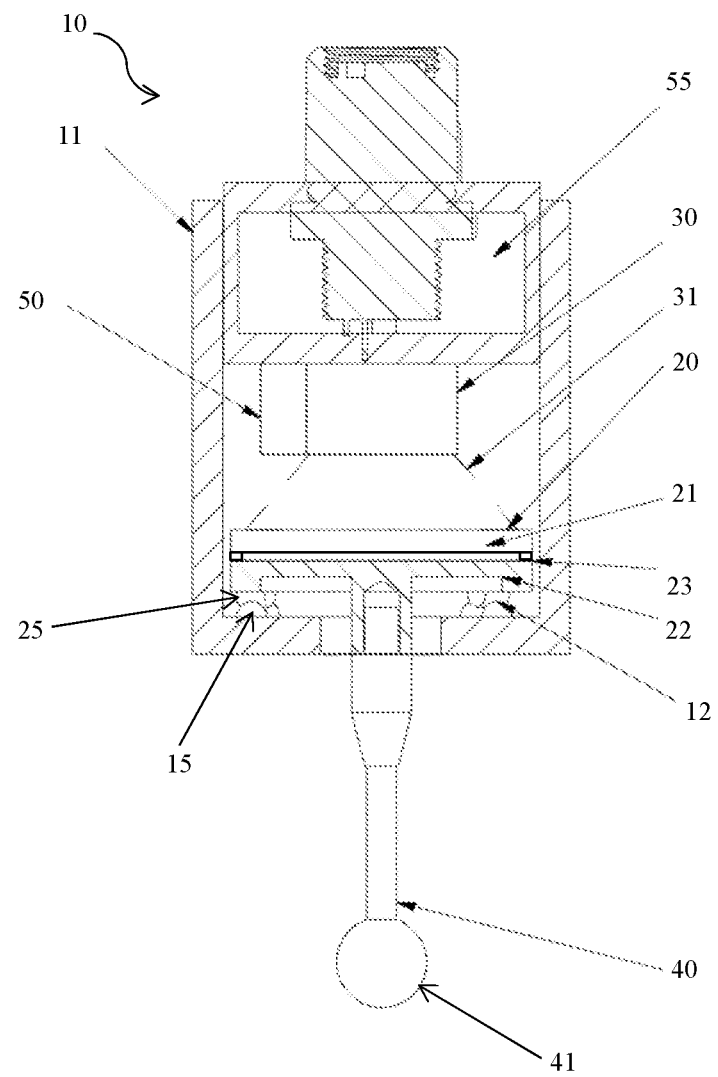
FIG. 1 is a cross-sectional view of a touch probe in accordance with an embodiment of the present disclosure.

Referring to FIG. 1, a container housing or body 11 supports a kinematic joint 12, and a moving assembly 20 is resting on the kinematic joint 12 against which it is spring-loaded by means of a suitable system connected to the main body 11. Such suitable system may be in the form, e.g., of a spring coiled adjacent the internal wall of the main body 11 (for clarity not shown in the drawings). The moving assembly 20 at rest in the kinematic joint constitutes the metrological reference for the touch probe system. The housing or body 11 may be of a cylindrical form as shown, or may be of other shapes if desired. When cylindrical in form, the cylindrical axis may define the axis of the probe. The kinematic joint 12 may comprise, e.g., projections 25 from the moving assembly abutting mated projections 15 from the body 11 as shown, or other conventional kinematic joint arrangements.

The moving assembly 20 comprises three elements: a semitransparent element 21 (such as optical glass transmission flat, preferably of from 1 to 3 mm thickness), a flexible reflector element 22, and a very thin (relative to the thickness of the semitransparent element 21) and highly parallel spacer element 23. The function of the spacer 23 is to create a very thin parallel layer of air between the flexible reflector 22 and the semitransparent element 21. Spacer 23 may be a completely separate element from the semitransparent element 21 and flexible reflector element 22 (e.g., in the form of a thin annular ring as shown), or may be in the form of one or more projections extending from a surface near the periphery of either element 21 or 22. While the spacing between the semitransparent element 21 and the flexible reflective element 22 is depicted as close in scale to the thickness of the semitransparent element, spacer 23 is preferably of relatively less thickness (e.g., from 0.005 to 0.01 mm), in order to provide a corresponding very thin gap. The functional surfaces of all three elements are preferably lapped to optical precision for best results.

Figure 2:
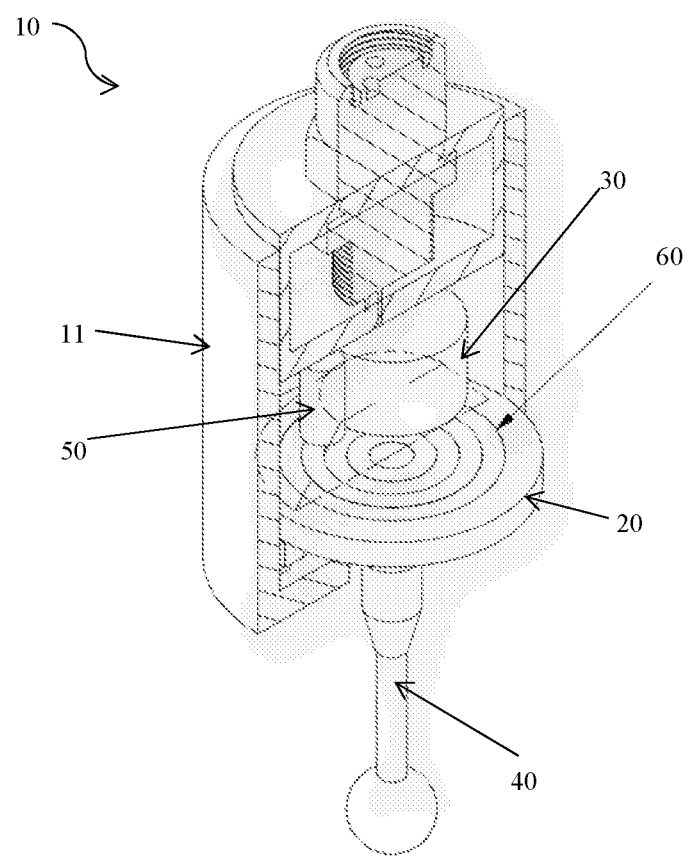
FIG. 2 is a sectioned perspective view of the touch probe of FIG. 1 in accordance with an embodiment of the present disclosure.

The body 11 also supports an illumination assembly made of a coherent source of monochromatic light, shown as a laser light source 30 in FIG. 1 which projects a field of coherent light, shown as laser light coherent field 31 in FIG. 1, towards the upper surface of the semitransparent element 21 of moving assembly 20. Laser light source 30 may be, e.g., a laser diode incorporated into touch probe assembly 10, in which case only electrical leads need be provided to the assembly 10. Alternatively, laser light source 30 may comprise a suitable fiber optic connection and conventional optics. Because the 21/23/22 moving assembly "sandwich" is illuminated by the provided highly coherent light, a pattern of interference fringes in the form, e.g., of Newton's rings 60 appears on the upper surface of the semitransparent element 21 as shown in FIG. 2, due to the coherent light being directed through the semitransparent element towards the reflective surface of the flexible reflective element, whereby the coherent light is partially internally reflected from the opposing surface of the semitransparent element surface and partially transmitted through the semitransparent element to the reflective surface of the flexible reflective element. Light reflected from the reflective surface thus can constructively or destructively interfere with the internally reflected light in the semitransparent element, dependent upon separation distances between the reflective surface of the reflective element and the opposing surface of the semitransparent element, and create the interference fringes seen on the upper surface of the semitransparent element 21. The size and position of the interference fringes or Newton's rings depend on the amount of parallelism between the lower face of the semitransparent element 21 and the upper face of the flexible reflector element 22.

A probe stylus 40 is further connected to the flexible reflector 22. The moving assembly 20 and stylus 40 are configured such that movement of the stylus responsive to a force on the stylus causes the flexible reflective element 22 to flex relative to a first relatively non-flexed position at rest. This arrangement allows early detection of deflection of the probe stylus 40 connected to the flexible reflector 22 caused by contact between the probe stylus 40 and the surface of the part being measured. When the probe stylus 40 is displaced in any direction, it will cause a deformation of flexible reflector 22 while the semitransparent glass element 21 remains relatively un-deformed. As a consequence of the local deformation of the flexible reflector 22, the distances between points on the reflective surface of the flexible reflector 22 and on the opposing surface of the semitransparent glass element 21 change. The configuration of interference fringes or Newton's rings 60 observed on the upper surface of the semitransparent glass element 21 will change rapidly in proportion to the deformation of the flexible reflector 22. The interference fringes or Newton's rings 60 will move to the outside or inside of the semitransparent glass element 21 surface depending on the size and direction of the deformation of the flexible reflector 22.

A detector 50 such as photodiode sensor(s) is further positioned in body 11 and configured for sensing changes in the interference fringes patterns observed over semitransparent glass element 21. Detector 50 may comprise, e.g., one or more photodiodes or a conventional CCD sensor. As the interference fringes or Newton's rings 60 move, a sequence of light and dark fringes will quickly pass in front of the detector 50 photodiode sensors in response to flexing of the flexible element and change in distances between points on the reflective surface of the flexible reflective element and on the opposing surface of the semitransparent element over the flexed area of the reflective surface. The gap distance between the opposing surfaces of the semitransparent element 21 and the flexible reflective element 22 will be constant along a fringe, and the light path length difference between two adjacent light or dark fringes is equal to the wavelength of the light, so the difference in the gap between the surfaces is one-half the wavelength. This technique accordingly is very sensitive to even very slight flexing of the reflector 21.

An electronic interface 55 further electronically connected to the detector 50 photodiode sensors (comprising, e.g., a processor and programming) will detect the event by analyzing the time or distance between two extremes of illumination or the derivate of the illumination. When the electronic interface 55 detects contact, it generates a trigger pulse that causes the CMM to which the touch probe is attached to register the position as a measured point.

The flexible reflector 22 is preferably of sufficient flexibility that it flexes sufficiently in response to minimal touch forces transmitted through the stylus to generate detectable changes in interference fringes without unseating the moving assembly from the kinematic joint 12. Flexible reflector 22 may comprise, e.g., a flexible metal (e.g., aluminum or silver or other reflective metal) layer of thickness from, e.g., 0.1 to 1 mm over at least a section thereof to provide sufficient flexibility. Remaining portions of the flexible reflector 22 may be significantly thicker (e.g., near the periphery where the flexible reflector is supported on the kinematic joint 12, and in the center where the stylus 40 is connected to the flexible reflector), in order to provide increased strength. As pressure generated by contact between the probe stylus 40 and the measured part increases, however, it may reach a level at which the kinematic joint 12 opens to avoid damage to the elements of the touch probe. The kinematic joint 12 thus serves primarily only to prevent damage to the elements while allowing the moving assembly 20 to be returned to the same metrological reference position each time the probe stylus 40 experiences excessive force.

Probe stylus 40 may further include a sensing tip 41 connected to the stylus at a free end of the stylus as may be conventionally employed in the CCM art.

While the above description references certain embodiments in detail, it will be understood that variants of these embodiments and other features and functions and alternatives thereof may be combined into many other different systems or applications. As such, various presently unforeseen or unanticipated alternatives, modifications, variations or improvements therein may be subsequently made by those skilled in the art, which are also intended to be encompassed by the following claims.

The invention claimed is:

1. A touch probe for sensing the position of a surface, having:

a housing;

a moving assembly supported within the housing and comprising a flexible reflective element, a spacer element, and a semitransparent element, wherein a reflective surface of the flexible reflective element and a surface of the semitransparent element opposing the reflective surface are separated by the spacer element in a first arrangement over a first area of the reflective surface when the flexible reflective element is in a first relatively non-flexed position, and wherein the moving assembly is movable in the housing from a rest location;

a stylus connected to the flexible reflective element, where the moving assembly and stylus are configured such that movement of the stylus responsive to a force on the stylus causes the flexible reflective element to flex and change distances, relative to the first relatively non-flexed position, between points on the reflective surface of the flexible reflective element and on the opposing surface of the semitransparent element over the first area of the reflective surface;

a coherent light source configured for providing coherent light incident upon the semitransparent element and directed through the semitransparent element towards the reflective surface of the flexible reflective element, whereby the coherent light is partially internally reflected from the opposing surface of the semitransparent element surface and partially transmitted through the semitransparent element to the reflective surface of the flexible reflective element, such that light reflected from the reflective surface can constructively or destructively interfere with the internally reflected light in the semitransparent element and create interference fringes over the first area dependent upon separation distances between the reflective surface of the reflective element and the opposing surface of the semitransparent element; and a detector configured for sensing changes in interference fringes patterns over the first area in response to flexing of the flexible element and change in distances between points on the reflective surface of the flexible reflective element and on the opposing surface of the semitransparent element over the first area of the reflective surface.

2. A touch probe according to claim 1, wherein the reflective surface of the flexible reflective element and the opposing surface of the semitransparent element are parallel and separated by a uniform distance over the first area when the flexible reflective element is in the first relatively non-flexed position.

3. A touch probe according to claim 1, further comprising a kinematic joint providing a repeatable rest location for the moving assembly in the housing, enabling movement of the moving assembly from the rest location responsive to a deflecting force on the stylus and return of the moving assembly to the rest location when the deflecting force is removed.

4. A touch probe according to claim 1, wherein the coherent light source projects a field of coherent light towards a surface of the semitransparent element.

* * * * *